United States Patent Office 3,273,095
Patented Sept. 13, 1966

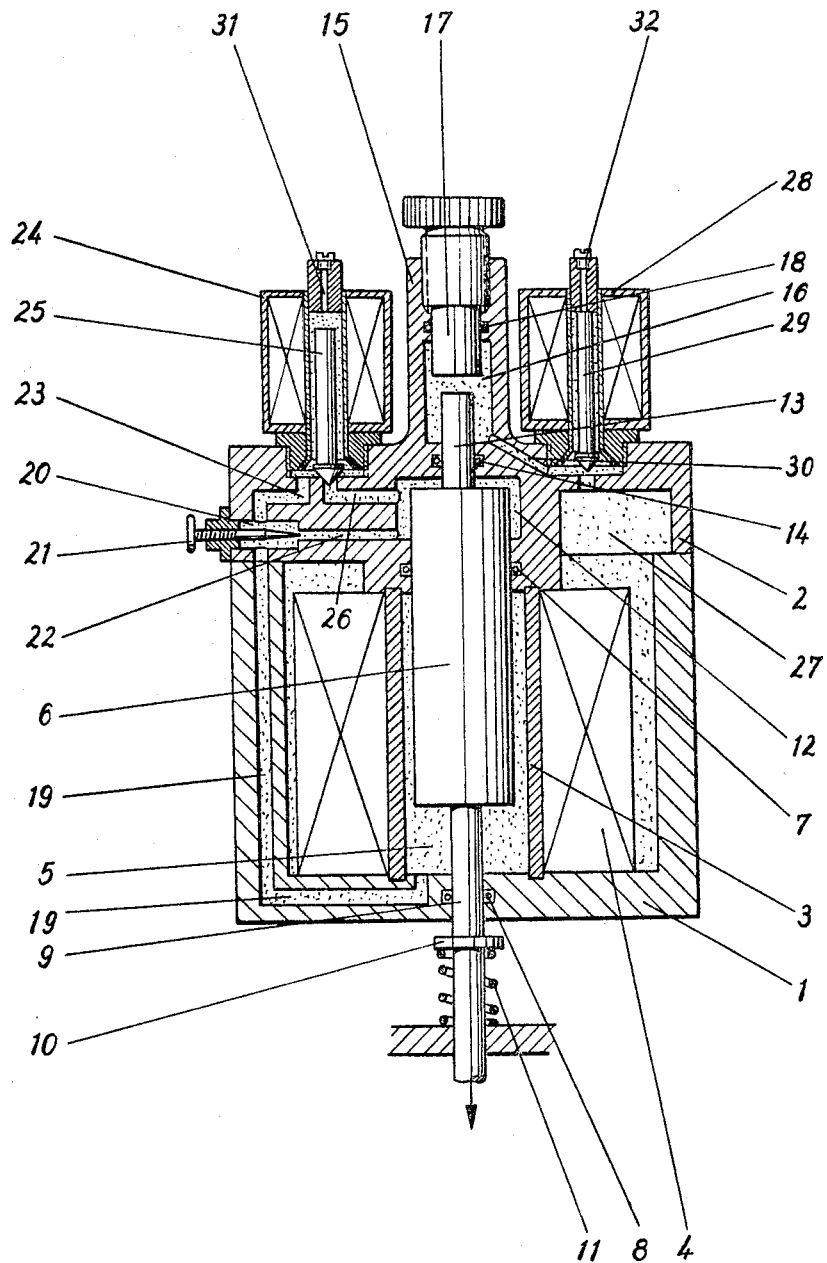

3,273,095
ELECTROMAGNETIC CONTROL MECHANISM, ESPECIALLY FOR REGULATING VALVES
Heinz Rossenbeck, Stuttgart-Bad Cannstatt, Germany, assignor to Concordia Maschinen- und Elektrizitats G.m.b.H., Stuttgart-O, Germany
Filed Nov. 3, 1964, Ser. No. 408,568
Claims priority, application Germany, Nov. 8, 1963, C 31,348
9 Claims. (Cl. 335—239)

The present invention relates to an electromagnetic control mechanism, primarily for operating and controlling regulating valves, which comprises a field coil, an armature which, when the field coil is energized, is moved in its axial direction against the action of a return spring, and a magnet housing which contains fluid-displacement chambers which are filled with oil or another suitable pressure fluid and are located above and below the armature and are adapted to communicate with each other through a control line in which a throttling member is provided which is preferably adjustable by hand.

The proper control of the valve movements of electromagnetically controlled regulating valves often has to comply with very different conditions. Prior to the invention, this could be accomplished only by rather complicated control mechanisms. For regulating the speed of operation of such a mechanism and of the regulating valve which is connected thereto, the armature of this mechanism was connected to a damping or brake piston and the rate of flow of the fluid produced by this piston from one displacement chamber to the other was controlled by adjustable throttles. These throttles could, however, generally be adjusted only by hand. Furthermore, if the particular apparatus or system to be controlled by the regulating valve was of the type which in certain cases, for example, in the event of a power failure, required that the regulating valve—instead of being opened or closed by the electromagnetic control mechanism—be temporarily arrested in the position to which it was last adjusted until the failure was overcome and the control mechanism could resume its normal operation, it was necessary prior to this invention to provide this mechanism with an additional arresting device.

It is now the object of the present invention to provide an electromagnetic control mechanism, primarily for operating regulating valves, which is of a very simple and compact construction and forms a single structural unit, can be manufactured at a much lower cost than any of the electromagnetic control mechanism which have previously been designed, and also has the considerable advantages over these known mechanisms that its speed of opening and closing the main regulating valve may be adjusted by remote control either by hand or by electric impulses transmitted from the apparatus or system to be controlled, and that its operation may be stopped in any desired position either automatically or by hand.

This object is fully attained according to the invention by providing the control mechanism not only with the usual control line between the fluid displacement chambers and with a manually adjustable throttle for varying the rate of flow of the fluid from one displacement chamber to the other, but also with a by-pass line between these two chambers and with an electromagnetic control valve which may be quickly opened or closed and permits the fluid to pass quickly from one displacement chamber to the other independently of the throttle valve. The control and by-pass lines may be combined with each other insofar as the by-pass line coming from one displacement chamber may terminate into the control line behind the throttle valve, as seen in the direction of flow of the damping fluid. When the control valve is opened, the damping fluid will therefore by-pass the throttle valve and flow quickly from one displacement chamber to the other. If the main regulating valve, the operation of which is to be effected and controlled by the electromagnetic control mechanism according to the invention, is rigidly connected to the armature of the latter, the rate of flow of the medium to be controlled by the regulating valve may adapt itself to the particular requirements in the operation of the apparatus or system just as quickly as these requirements may change from one moment to the other. As long as the rate of flow of the medium to be controlled by the regulating valve remains average, the flow of the damping fluid from one displacement chamber to the other proceeds through the throttle valve and the rate of flow is therefore considerably restricted. Consequently, the changes in the positions of the regulating valve resulting from the normal impulses which are transmitted to the electromagnetic control mechanism by the impulse transmitter of the apparatus or system to be controlled are effected quite slowly. The curvature of the regulating characteristic is therefore the flatter the more tightly the throttle valve is set. The return movements of the control mechanism and thus also of the regulating valve are effected by a spring.

If, however, a large supply of the medium to be controlled by the regulating valve is suddenly required, a corresponding electric impulse is sent by the impulse transmitter of the apparatus or system to the electromagnetic control valve of the control mechanism with the result that this valve quickly opens the by-pass line so that the main armature which effects the displacement of the fluid from one displacement chamber to the other and which is also positively connected to the main regulating valve will be moved downwardly toward the latter quickly and without any interference and will thereby open this valve very quickly and fully.

Another important feature of the present invention consists in the provision of additional means for suddenly stopping the movement of the main armature of the electromagnetic control mechanism whenever this becomes desirable or necessary, for example, in the event of a power failure, so as to maintain this armature and the regulating valve thereon in the position to which they were last adjusted until the failure has been overcome and the normal operation of the control mechanism and the regulating valve can be resumed. These additional means preferably consist of a second electromagnetic control valve which is adapted to block the flow of oil or other pressure fluid to and from a further displacement chamber into which a piston projects which is positively connected to one end of the main armature and extends coaxially thereto. During the normal operation of the control mechanism, this second control valve is always energized and open so that the fluid which is displaced by the mentioned piston from the additional displacement chamber can flow off without any interference into a fluid-reserve chamber. If, however, this second control valve is switched off and closed, for example, due to a power failure, the fluid can no longer be displaced by the piston and flow off, and the piston together with the armature thereon and thus also the regulating valve are stopped from moving out of their positions in which they were last located.

Another feature of the invention consists in providing the additional displacement chamber into which the mentioned piston projects within the main housing of the control mechanism at a point above that main displacement chamber into which the main armature projects when the field coil thereof is not energized. As already indicated, this additional displacement chamber may be connected by a line which is adapted to be opened or closed by the second control valve to a fluid-reserve chamber which is connected by suitable means to the outside so as to be under atmospheric pressure.

A further feature of the invention consists in the provision of means for effecting a precision adjustment of the main regulating valve. These means may consist of a setting piston which is manually adjustable from the outside and projects likewise into the additional displacement chamber and extends coaxially to the other piston which is secured to the armature, but never directly engages with this other piston. When this setting piston is moved more deeply into or farther out of the additional displacement chamber, the volume of this chamber is changed which, in turn, effects a change of the position of the other piston which is secured to the main armature. Thus, for example, if the setting piston is moved more deeply into the chamber, the other piston is forced hydraulically for an equal distance farther out of this chamber.

For the purpose of combining the various elements of the elecrtomagnetic control mechanism so as to form a single structural unit which can be easily manufactured as well as operated, the invention further provides that the first control valve for opening and closing the by-pass line, the second control valve for opening and closing the line leading from the additional displacement chamber to the fluid reserve chamber, as well as this additional displacement chamber and the setting piston which projects into this chamber are located at the end of the main housing of the control mechanism toward which the main armature is pressed by the return spring when the main field coil is not energized.

The above-mentioned as well as further features and advantages of the present invention will become more clearly apparent from the following detailed description thereof which is to be read with reference to the accompanying drawing which shows a longitudinal section of the electromagnetic control mechanism according to the invention which is adapted to be connected, for example, to a regulating valve for controlling and varying the positions thereof.

The control mechanism according to the invention as illustrated in the drawing comprises a cup-shaped lower housing 1 the open upper end of which is closed by a cover 2 which forms a magnetic shunt element. A nonmagnetic armature guide bushing 3 is tightly clamped between this cover 2 and the bottom of the housing part 1 and forms the inner wall of an annular chamber in which a main field coil 4 is inserted. The inside of the tubular guide bushing 3 forms a first fluid-displacement chamber 5 in which a main armature 6 is slidable which serves as a damping piston. The displacement chamber 5 is tightly sealed in both directions of the armature 6 by sealing rings 7 and 8. The armature 6 is provided on its lower end with a cylindrical shaft-like extension 9 of a smaller diameter which is guided within a bore in the bottom wall of housing 1 and has a flange 10 below the bottom of the housing 1 upon which a return spring 11 exerts a pressure which tends to return the aramture 6 to its neutral uppermost position. The upper part of the main armature 6 projects into a second fluid-displacement chamber 12 which is provided within the cover 2. The upper end of armature 6 carries a piston 13 which is rigidly secured thereto and slidable within a bore in the upper wall of the cover 2 in which it is sealed by a sealing ring 14.

The cover 2 is provided on its upper wall with a tubular extension 15 which extends coaxially to the armature 6 and piston 13 and contains an additional displacement chamber 16 into which the piston 13 projects. This displacement chamber 16 is closed at its upper end by a screw plug which has a knurled knob on its outer end and a setting piston 17 on its inner end and projecting into the chamber 16. Chamber 16 is sealed toward the outside by a sealing ring 18.

The wall of the magnet housing 1 contains a control line 19 which is connected at its lower end to the first displacement chamber 5 and extends vertically upwards to a throttle chamber 20 in the cover 2 through which a throttle member in the form of a setscrew 21 extends which may be manually adjusted from the outside so as to vary the size of the opening into a channel 22 which leads into the second displacement chamber 12.

The control line 19 is further connected with the second displacement chamber 12 by a by-pass line 23, 26 which starts at the throttle chamber 20 and by-passes the throttle member 21 and the channel 22 and has a larger diameter than the latter. The flow of pressure fluid through this by-pass line is controlled by a first electromagnetic control valve 24 which is mounted on the cover 2 and the armature 25 of which is adapted by means of the valve cone on its lower end to open and close the outlet opening of this valve which leads through the second part 26 of the by-pass line to the second displacement chamber 12.

Cover 2 and housing 1 further contain a fluid-reserve chamber 27 which is connected by suitable means, not shown, with the outside so as to be under atmospheric pressure. The upper wall of the cover 2 further carries a second electromagnetic control valve 28, the armature 29 of which also has a valve cone on its lower end which is adapted to open and close a channel 30 which connects the additional displacement chamber 16 with the fluid-reserve chamber 27.

The manner of operation of the control mechanism is as follows: At first, all available spaces within the entire housing of the apparatus are filled with oil or another pressure fluid which may be done through the inlet openings 31 of the control valves 24 and 28 which thereafter are tightly closed by screws 32. Venting screws, not shown, are also provided to prevent any air bubbles from settling at the inside of the magnet housing.

During the normal operation of the regulating valve to which the lower end of the rod 9 is connected, the first control valve 24 is closed, while the second control valve 28 is energized and thus always remains in the open position. When the main field coil 4 is energized, the main armature 6 is drawn downwardly from the position as shown in the drawing and presses upon the liquid in the lower displacement chamber 5 which is thereby forced through the line 19, the throttle chamber 20, and the channel 22 into the upper displacement chamber 12. The rate of flow of the pressure fluid from one displacement chamber to the other and thus the length of time required for the downward movement of the armature 6 depends upon the particular adjustment of the setscrew of the throttle member 21. By this downward movement, the connecting rod 9 acts upon the valve member of the main regulating valve (not shown) and thereby opens the latter to the extent as required. When the throttle member 21 is most suitably adjusted, the regulating characteristic has the form of an only slightly dented line. If the apparatus or system suddenly requires the supply of a large amount of the medium to be controlled by the regulating valve, an electric control impulse is transmitted to the field coil of the first control valve 24 so that the latter opens the channel 26. The liquid then by-passes the throttled channel 22 and flows directly from one displacement chamber to the other so that the regulating valve will be closed very quickly.

It has previously already been stated that during the normal operation of the regulating valve the second control valve 28 is energized and in the open position. If, however, for certain reasons it becomes desirable or necessary that the regulating valve be stopped in the position to which it was last adjusted by the control mechanism, the second control valve 28 is switched off and deenergized and is thereby closed. This may be effected by special switch means or it may occur automatically as the result of a power failure. Until this power failure is overcome or the current is again switched on so that the second control valve 28 is again energized, the pressure fluid is prevented by the closed control valve 28 from flowing out of the additional displacement chamber 16. This chamber 16 is thus tightly closed which has the result that the piston 13 can no longer move in this chamber and that the movement of the main armature 6 and thus also of the valve member of the regulating valve is suddenly stopped despite the action of the return spring 11. If this occurs at a time when the regulating valve deviates from its normal position, the rate of flow of the medium passing through the main regulating valve may be either too large or too small for the needs of the apparatus or system. In such an event it becomes necessary to correct the position of the valve member of the main regulating valve. This may be effected by turning the knurled knob on the outer end of the setting piston 17 in one direction or the other, whereby this piston is screwed farther into or out of the displacement chamber 16. If the setting piston 17 is screwed farther into this chamber 16, the hydraulic pressure which is then produced therein forces the other piston 13 on the main armature 6 downwardly. This movement is transmitted by the connecting rod 9 to the regulating valve which is thus adjusted accordingly. If, on the other hand, the setting piston 17 is screwed farther outwardly, a vacuum is produced in chamber 16. This vacuum together with the force of the return spring 11 then forces the piston 13 together with the armature 6 and the valve member of the regulating valve in the upward direction.

In this connection it should be pointed out that the adjustment of piston 13 as above described should only be effected hydraulically. The two pistons 13 and 17 should therefore be of such a length that their free end surfaces can never directly engage with each other. Thus, the movements of piston 13 will never be blocked mechanically and therefore, when the second control valve 28 is again switched on or the power failure is overcome, the piston 13 can again displace the pressure liquid from the displacement chamber 16 and the main armature 6 can again carry out its movement and adjust the positions of the main regulating valve.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. An electromagnetic control mechanism, primarily for operating and controlling a regulating valve, comprising a closed housing, field coil in said housing, an armature in said housing, a return spring acting upon said armature, said armature being adapted to move in its axial direction against the action of said return spring when said field coil is energized, connecting means on one end of said armature for connecting the same to an element to be moved and controlled thereby, a pair of fluid-displacement chambers within said housing at the opposite ends of said armature, a control line connecting said chambers with each other, a throttle valve within said control line, means for manually adjusting said throttle valve from the outside of said housing for varying the rate of flow of a pressure fluid through said control line, a by-pass line also connecting said chambers with each other and bypassing said throttle valve; said chambers, said control line, and said by-pass line adapted to be filled with said pressure fluid, and an electromagnetic control valve for opening and closing said by-pass line, said armature projecting with its opposite ends into said chambers and being adapted when moved in one direction to move with one end more deeply into a first of said chambers and with its other end farther out of the second chamber so as to convey said pressure fluid from said first chamber to said second chamber through said control line and said throttle valve when said control valve is closed and also through said by-pass line and said control valve when said control valve is open.

2. An electromagnetic control mechanism, primarily for operating and controlling a regulating valve, comprising a closed housing, field coil in said housing, an armature in said housing, a return spring acting upon said armature, said armature being adapted to move in its axial direction against the action of said return spring when said field coil is energized, connecting means on one end of said armature for connecting the same to an element to be moved and controlled thereby, a pair of fluid-displacement chambers within said housing at the opposite ends of said armature, a control line connected at one end to one of said chambers and at the other end to two branch lines both leading into the other chamber, a throttle valve in the first of said branch lines, means for manually adjusting said throttle valve from the outside of said housing for varying the rate of flow of a pressure fluid through said first branch line; said chambers, said control line, and said branch lines adapted to be filled with said pressure fluid, and an electromagnetic control valve for opening and closing the second of said branch lines, said armature projecting with its opposite ends into said chambers and being adapted when moved in one direction to move with one end more deeply into a first of said chambers and with the other end farther out of the second chamber so as to convey said pressure fluid from said first to said econd chamber through said control line, said throttle valve, and said first branch line when said control valve is deenergized and closed and also through said second branch line and said control valve when said control valve is energized and open.

3. An electromagnetic control mechanism as defined in claim 1, further comprising means for stopping said armature in any position to which it has been moved.

4. An electromagnetic control mechanism as defined in claim 1, further comprising means for stopping said armature in any position to which it has been moved, said means comprising a further fluid displacement chamber adapted to be filled with a pressure fluid, a piston secured to one end of said armature and extending coaxially thereto through a wall of one of said first two displacement chambers into said further displacement chamber, an outlet on said further displacement chamber, and a second electromagnetic control valve adapted to open and close said outlet.

5. An electromagnetic control mechanism as defined in claim 4, wherein said first and second displacement chambers form upper and lower chambers, said further displacement chamber being located above said upper chamber into which said armature deeply projects under the action of said return spring when said field coil is not energized.

6. An electromagnetic control mechanism as defined in claim 4, further comprising a fluid-reserve chamber within said housing, said outlet forming a channel connecting said further displacement chamber with said fluid-reserve chamber.

7. An electromagnetic control mechanism as defined in claim 4, further comprising a setting piston projecting into said further displacement chamber coaxially to said piston on said armature but never directly engaging with said piston on said armature, and means for adjusting said setting piston in its axial direction from the outside of said housing so as to vary the distance between the ends of said two pistons within said further displacement chamber.

8. An electromagnetic control mechanism as defined in claim 4, wherein said first and second control valves and said further fluid-displacement chamber are mounted on the end of said housing toward which said armature is pressed by said return spring when said field coil is not energized.

9. An electromagnetic control mechanism as defined in claim 4, wherein all of said elements are combined so as to form a single compact unit.

References Cited by the Examiner

FOREIGN PATENTS

| | | |
|---|---|---|
| 409,796 | 2/1925 | Germany. |
| 1,737,087 | 1/1957 | Germany. |

BERNARD A. GILHEANY, *Primary Examiner.*

G. HARRIS, JR., *Assistant Examiner.*